(12) United States Patent
Broman et al.

(10) Patent No.: US 6,296,746 B1
(45) Date of Patent: Oct. 2, 2001

(54) BIPOLAR ELECTRODE FOR ELECTROCHEMICAL REDOX REACTIONS

(75) Inventors: Barry Michael Broman, Kirkland, WA (US); Andrea Zocchi, Florence; Alberto Pellegri, Germignaga, both of (IT)

(73) Assignee: Squirrel Holdings Ltd., George Town (KY)

( * ) Notice: Subject to any disclaimer, the term of this patent is extended or adjusted under 35 U.S.C. 154(b) by 0 days.

(21) Appl. No.: 09/529,735
(22) PCT Filed: Jul. 1, 1999
(86) PCT No.: PCT/IT99/00196
§ 371 Date: Apr. 12, 2001
§ 102(e) Date: Apr. 12, 2001
(87) PCT Pub. No.: WO01/03213
PCT Pub. Date: Jan. 11, 2001

(51) Int. Cl.[7] ..................................................... C25B 11/12
(52) U.S. Cl. ............................ 204/294; 429/41; 429/42; 429/44; 429/210; 429/231.8; 29/623.1; 29/623.2; 29/623.4; 29/623.5
(58) Field of Search ..................................... 204/254, 255, 204/268, 269, 294; 429/210, 231.8, 41, 42, 44; 29/623.1, 623.2, 623.4, 623.5

(56) References Cited

U.S. PATENT DOCUMENTS

| 4,339,322 | | 7/1982 | Balko et al. ............................ 204/255 |
| 5,026,402 | * | 6/1991 | Bose et al. ............................ 29/623.5 |
| 5,413,738 | * | 5/1995 | Lewis et al. ............................ 204/294 |
| 5,582,937 | * | 12/1996 | LaFollette ............................ 29/623.1 |
| 5,656,390 | * | 8/1997 | Kageyama et al. ..................... 429/44 |
| 5,955,215 | * | 9/1999 | Kurzweil et al. ........................ 429/41 |
| 5,998,057 | * | 12/1999 | Koschany et al. ....................... 429/42 |
| 6,103,413 | * | 8/2000 | Hinton et al. .......................... 429/210 |

FOREIGN PATENT DOCUMENTS 2 157 482 A   10/1985   (GB) .

OTHER PUBLICATIONS

Patent Abstracts of Japan, vol. 1995, No. 01, Feb. 28, 1995 and JP 06 290796 A, Oct. 18, 1994, Abstract.
Patent Abstracts of Japan, vol. 012, No. 398, Oct. 21, 1988 and JP 63 140095 A, Jun. 11, 1988, Abstract.

* cited by examiner

Primary Examiner—Bruce F. Bell
(74) Attorney, Agent, or Firm—Connolly Bove Lodge & Hutz

(57) ABSTRACT

Carbon-base bipolar electrode for electrochemical redox reactions in an acid electrolyte in the form of a fluid impervious and electrically conductive septum, at least a face of which consists, at least partially, of a fluid previous woven or unwoven electrodically active fabric of carbon fibers or of yarns of carbon fibers, has an electrically conductive fluid impervious septum consisting of a composite of a matrix fabric in the form of a tightly knit or woven fabric of carbon fibers or of yarns of carbon fibers the pores of which are hydraulically sealed by an electrically conductive carbon containing material at least partly filling the pores of said matrix fabric. The carbon containing electrically conductive material may be a glassy carbon formed in situ by thermal conversion of a precursor material with which said matrix fabric is pre-impregnated or a polymerized thermosetting resin loaded with carbon and/or graphite particles and/or fibers or a thermally reflown aggregate of a thermoplastic resin an carbon and/or graphite particles and/or fibers. The pervious fabric on the face of the electrode may be a raised pile of carbon fibers.

12 Claims, 3 Drawing Sheets

BIPOLAR ELECTRODE FOR ELECTROCHEMICAL REDOX REACTIONS

BACKGROUND OF THE INVENTION

1. Field of the Invention

The present invention relates to electrodes for electrochemical reactions in acid electrolytes and more in particular to carbon-base electrodes.

There are innumerable processes wherein it is usefull or convenient to reduce or oxidize a compound present in ionic form (dissolved) in an electrolyte. Most often the electrolyte is an acid aqueous solution containing ions of the dissolved compound to be reduced or oxidized.

A most typical processing of this type is represented by a so-called redox flow cell, the development of which has received a decisive thrust as a potentially efficient and simple way of storing excess or recoverable electrical energy in chemical form (secondary battery systems).

Of course this is not the only area of utility of electrochemical redox processing, many chemical synthesis, regeneration of pickling liquors and pollution control processes have the necessity of reducing or oxidizing certain dissolvable compounds.

In all these type of electrochemical redox processes, the half-cell conditions at one or at both electrodes must prevent undesired parasitic oxidation or reduction reactions in order to ensure a high yield (and therefore a high energy efficiency) of the specific oxidation or reduction reaction to be performed at the particular electrode (half-cell). Most typical is the requirement of preventing electrolysis of the solvent. In an aqueous electrolyte it is essential to prevent water electrolysis and this may require that either oxygen evolution at the positive electrode and/or hydrogen evolution at the negative electrode be effectively prevented.

These requirements tend to exclude the use as electrodes in such half-cell systems of conductive materials having an intrinsically low overvoltage for the unwanted reaction. In the case of an aqueous electrolyte, this will exclude materials exhibiting a particularly low oxygen and/or hydrogen overvoltage.

These requisites, coupled to the requirement for the electrode to be perfectly resistant to aggressive acid electrolytes and to the ionic species intervening (nascent species) in the half-cell reaction, greatly restrict the number of usable materials.

One of the electrodic material that is more widely used under these peculiar conditions remains carbon, in its various forms.

2. Discussion of Related Art

Graphite, amorphous carbon, activated charcoal, glassy carbon, are the basic electrically conductive materials used for fabricating electrodes for this type of applications.

Solid graphite or the mechanically stronger glassy carbon plate are often used as bipolar electrodes. However, their electrodic performance is rather low.

Considerations on the rate limiting factors of the half-cell redox reactions generally dictate the use of electrodes having a large active surface for unit of projected cell (electrode) area in order to be able to support the half-cell reaction at an acceptable rate without causing an abrupt increase of the half cell voltage due to intervening <<saturation>> effects of the mass transfer mechanisms to and from active sites on the electrode surface, eventually across the so-called electrode's double layer, often compounded in empirically determined potential coefficients. An increase of the half-cell voltage will in turn promote parasitic half-cell reactions, for example oxygen and/or hydrogen evolution at the respective positive and negative electrodes.

Porous carbon electrodes, in the form of a Teflon® (a registered trademark of E. Du Pont de Nemours) bonded porous layer of carbon particles directly bonded to a ion exchange membrane or microporous separator of the electrochemical cell have been proposed for redox flow batteries (re: GB-A-2,030,349-A), however these bonded electrodes structures though ensuring a truly minimized cell gap, the thickness of which may correspond to the thickness of the ion exchange membrane or microporous diaphragm used as the cell separator (so-called SPE cells from the acronym of Solid Polymer Electrolyte), pose a serious often insuperable problem of efficiently and reliably collecting and distributing electric current to and from the bonded electrode layer. The limited electrical conductivity of these resin bonded porous carbon particle layers and the practical difficulty of establishing reliable point-like contacts between a suitable current distributor and the electrodically active bonded layer by pressure make this cell architecture impracticable especially in case of relatively large area cells, stacked together in a bipolar cell assembly that may include up to one hundred or even several hundreds of cells in electrical series.

The use of porous carbon fabrics or felts sandwiched between the cell separator and a current collector, in lieu of bonded carbon layers, though ensuring a good lateral conductivity of the porous electrode layer, represented by the carbon fabric or felt, still presents problems as far as the establishment of reliable pressure-held electrical contacts with the current distributor structure is concerned, especially in multicell stacks.

In general, pressure held electrical contacts between carbon materials in electrolytes show extremely erratic contact resistances that tend to increase in time, probably due to the build up of filming compounds chemically bonded to the carbon material.

In an attempt to overcome the problems of reliably distributing and drawing current from a porous (three-dimensional) active electrode structure and of ensuring a low-resistive path for the electric current to and from the potentially active sites of a relatively porous electrode structure (three-dimensional), it has been proposed to directly bond an adequately porous (high specific surface), three-dimensional carbon electrode structure, permeable to the electrolyte, to a suitable electrically conductive substrate which may constitute the end wall of the electrode (or half-cell) compartment or a fluid impervious bipolar septum that provides for electrical continuity between a positive electrode bonded to one face and a negative electrode bonded to the other face thereof, belonging to two distinct cells, respectively, of a stack of cells.

The bipolar electrode structure so constituted hydraulically separates the negative half-cell compartment of a cell from the positive half-cell compartment of an adjacent cell in the stack or battery of cells in electrical series with one another.

The electrically conductive separating septum may be of a suitable thermoplastic resin, for example high density polyethylene (HDPE) mixed with a styrene-ethane/butylstyrene (SEBS) block polymers or with a styrene-isoprene-styrene copolymer loaded with carbon black graphite fibers and/or carbon powder or other corrosion resistant conductive material powder in order to provide for an adequate electrical conductivity.

Alternatively, attempts have been made to bond a carbon felt on the face of a solid glassy carbon, graphite or carbon plate with carbon loaded conductive adhesives. However, these attempts were frustrated by an insufficiently reliable bonding and for large cell areas the use of solid graphite or glassy carbon plate is costly and prone to disaster cracks.

Known bipolar electrode structures, when adapted for a specific use in redox flow cells, have been found to have serious drawbacks.

Even the lamination process of a highly porous and permeable carbon electrode layers to a thermoplastic aggregate is extremely difficult because of the inability of applying a lamination pressure capable on one side to promote an intimate adhesion of the felt or fabric to the partly fluidized thermoplastic aggregate without permanently collapsing the felt or fabric and/or embedding it in the thermoplastic aggregate. Moreover, the requisites of such a post-lamination process for joining together and in an electrical path continuity condition the thermoplastic aggregate to the porous electrode structures contrast with the requirements of a low resistivity of the aggregate, by severely limiting in practice the amount of conductive powder that can be loaded without impairing the possibility of post-laminating the porous electrodes onto the pre-formed conductive sheet.

Another intrinsic limitation of these hot pressed composites is that often practically only relatively few filaments or fibers of the felt or fabric electrode becomes bonded in an electrically conductive manner to the electrically conductive thermoplastic aggregate sheet.

Distribution of electric current through the remaining porous layer of the felt or fabric relies on fortuitous electric paths among microscopically distant points of the porous structure of the felt or fabric. Most of these fortuitous electric paths through the mass of the porous electrode structure entail fibers that are oriented substantially parallel to the plane of the composite and which form or contribute to form relatively tortuous and long paths which inevitably represent highly resistive electric paths.

Whichever the arrangement used, another severe drawback of the so hot pressed carbon fabric or felts of carbon fibers is represented by their limited residual <<permeability>> to a streaming electrolyte being flown through the electrode compartment.

Indeed, though the fabric or felt may be rendered quite hydrophilic by appropriate treatments and be readily permeable to the liquid electrolyte, their intertwined structure represents a relatively large pressure-drop path for a streaming electrolyte being pumped through the half-cell compartment.

On the other hand, the intertwined structure cannot be to loose or have an unlimitedly large void ratio because electrical bulk conductivity through the felt may decline intolerably. Therefore, the streaming electrolyte inevitably will tend to flow almost exclusively through preferential <<bypass>> paths, typically through flow spaces or channels defined by the current distributor structure and/or through gaps that may form between the surface of the ion exchange membrane or microporous separator and the fabric or felt electrode.

In practice the electrolyte within the intricate mass of carbon fibers or filaments of the felt or fabric electrode will be <<refreshed>> practically only through local diffusion processes, driven by intervening concentration gradients rather than being more effectively and uniformly <<refreshed>> by the hydraulic flow imposed by pumping.

Indeed, the overvoltage developed at the half-cell upon an increase of the current density may in large measure be due to a grossly inadequate mechanical transport (distribution) of the reacting species toward the population of active sites within the three-dimensional electrode structure.

All these aspects of known carbon electrode structures and the intrinsic critical aspects and limitations thereof document the great difficulty of realizing an electrodic structure of low electrical resistance and capable of sustaining high current densities of up to 1000 A/m$^2$ or even higher without a severe decline of the voltage characteristics of the electrochemical redox cell.

Finally the known bipolar electrode assemblies are rather heavy, the main contribution to their weight being represented by the conductive thermoplastic septum or backbone.

GENERAL DESCRIPTION OF THE INVENTION

It has now been found and represents the object of the present invention a particularly effective bipolar electrode structure for redox reactions in an acid electrolyte that overcomes the limitations of prior art electrodes as mentioned above and practical methods for fabricating it.

A first essential aspect of the invention, which overcomes the fragility and relatively heaviness drawbacks of a solid carbon plate is that the electrically conductive and fluid impervious septum is a composite material based on a tightly knit or woven matrix fabric of carbon fibers or of yarns of carbon fibers that combines an outstanding toughness and excellent flexibility to a good transverse electrical conductivity and to a remarkable lightweight.

Fluid imperviousness is then imparted to the septum by sealing the pores of the tightly knit matrix fabric either with an electrically conductive glassy carbon formed in situ by carbonization of a precursor material, with which the matrix fabric is pre-impregnated.

Alternatively, the matrix fabric may be pre-impregnated with a thermosetting resin or with a mixture of thermosetting and thermoplastic resin precursors conventionally loaded with carbon powder and/or fibers so as to produce an electrically conductive pore sealing aggregate upon polymerizing the resin.

According to another alternative, fluid imperviousness is imparted by hot laminating a matrix fabric with at least one or preferably between two foils of an electrically conductive thermoplastic resin loaded with carbon powder and/or fibers at a temperature sufficient to cause a reflow of the thermoplastic resin. The reflown aggregate adapts itself to the surface morphology of the matrix fabric substrate, effectively sealing it with a film of conductive resin partly encroaching into the pores open to the surface of the matrix fabric.

A second aspect of the invention is represented by the fact that whichever the electrically conductive material that is used to render fluid impervious the electrically conductive matrix fabric, according to the above stated alternatives, the sealing material also fuses and/or bonds to the fluid impervious and electrically conductive septum, so being constituted, superficial carbon fibers or yarns of carbon fibers of a fluid pervious fabric or mat pinned in contact with the surface of the pre-impregnated matrix fabric or with a reflowable interposed foil of electrically conductive thermoplastic aggregate during the process of the sealing of the pores by the electrically conductive material.

Most preferably, while the matrix fabric is tightly woven or knit and presents a limited transverse porosity and a high tensile strength, the fluid pervious fabrics bonded to the opposite faces of the sealed septum consist of a relatively open woven or knit fabric or of an unwoven open mat or felt of carbon fibers or yarns of carbon fibers that is readily permeated by an electrolyte and actually permits a flow of the electrolyte therethrough.

The bipolar structure of the invention has an outstanding mechanical toughness allowing moderate to extensive deflections without cracking, is relatively lightweight and provides for outstanding transverse electrical conductivity. This last and fundamental characteristic is due to the fact that, differently from the known structures, the presence and influence of dielectric binders (resin) is either eliminated as in the case of an in situ conversion of an impregnating precursor material into an electrically conductive glassy carbon filling interstices and fusing together the fibers or significantly minimized in the case of a carbon loaded thermosetting resin pre-impregnated into the matrix fabric or of a sandwiched thin foil of reflowable carbon loaded thermoplastic aggregate.

A fundamental feature of the electrode structure of the invention is the peculiar constitution of the fluid impervious and electrically conductive septum onto the faces of which electrodically active porous fabrics of carbon fibers or yarns are present. Indeed, the composite septum is substantially fluid impervious to prevent intermixing of positive and negative charged electrolytes present in chambers belonging to two distinct electrochemical cells electrically in series with each other. At the same time, the septum provide for a low ohmic drop electrical path for the current. Being the bipolar electrode structure necessarily or most preferably a substantially all-carbon structure, the nonnegligible resistivity of carbon dictates the absolute need to reduce as much as possible transverse electrical conductivity across the bipolar electrode structure.

In this perspective, the impervious electrically conductive carbon septum has a determinant role.

According to the invention, transverse electrical conductivity is greatly enhanced by substantially eliminating the presence of an electrically nonconductive binder matrix as commonly used in prior art bipolar carbon electrode structures. The fabric of carbon fibers or of yarns of carbon fibers constitutes a mechanical tough and electrically conductive backbone or matrix, the porosity of which is sealed by filling it with eminently electrically conductive glassy carbon according to an embodiment, which is formed in situ within the pores of the matrix fabric by carbonizing a precursor material with which the fabric is pre-impregnated with.

The matrix fabric backbone ensure mechanical strength amply compensating for the fragile characteristic of glassy carbon. Therefore the composite becomes substantially rigid though it may be bent slightly without cracking.

The matrix fabric may be made of carbon fibers obtained by carbonization either from polyacrylonitrile (PAN) or from pitch or other suitable precursor material.

The fabric may be a woven or knitted fabric or may be even a unwoven matted or felted fabric, and in any case it has preferably a relatively tight structure. In case the fabric is made of spun yarns of carbon fibers these yarns may have a moderate or relatively high twist to enhance tightness and microporosity, coupled to a relatively high tensile strength.

The fabric may be woven or knit with carbon fibers or yarns or it may originally be a fabric of a precursor, such as a polyacrylonitrile fabric, that is subsequently carbonized.

In case of a woven or knit fabric, the fabric may be a plane weave fabric or have a more complex weave.

The thickness of the matrix fabric may range from about 0.5 mm to 2 or more millimeters, depending on the cell area for which the bipolar electrode is destined. Alternatively, two or more pieces of the same carbon cloth may be stacked together to build up the desired thickness of the composite septum.

The precursor material may be any suitably soluble or suspendable, partly polymerized or prepolymers of polyester, polyether, polyurethane, furfuryl alcohol prepolymer and the like. Preferably, a partly polymerized phenolic resin, optionally diluted in a suitable solvent such as acetone, in order to adjust the viscosity, or a furan resin such as a furfuryl alcohol and low molecular weight, furfuryl alcohol prepolymer eventually admixed with an ester, an ether or with polyether and/or polyurethane particles suspended therein, may be used for impregnating the matrix fabric.

The carbonization treatment may be conducted in the vicinity of 1000° C. or even at a higher temperature, in a nonoxidizing atmosphere, for example under nitrogen atmosphere for several hours.

Before subjecting the matrix fabric to impregnation with a glassy carbon precursor solution or with the thermosetting resin and conductive carbon powder mix, the fabric may be subjected to heat treatments under controlled atmosphere to condition the surface of the carbon fibers by promoting the formation of chemically bound active groups on the surface of the carbon fibers to improve wettability and promote the fullest impregnation of all the porosities of the matrix fabric with the precursor solution or with the loaded resin mix.

Where distinct fabrics are used, a first as matrix fabric and a different fabric as fluid pervious open electrode, the fluid pervious fabric of carbon fibers or of yarns of carbon fibers to be bonded in electrically continuity on the opposite faces of the hydraulically sealed matrix fabric may also be a woven, knitted or a unwoven felted or matted fabric of carbon fibers or of yarns of carbon fibers made either from polyacrylonitrile (PAN) or from pitch of other suitable precursor material. Even in this case, the fabric may be made with carbon fibers or be a woven or a felt of fibers of a precursor material that is thereafter carbonized.

Contrary to the matrix fabric, this different fabric has a relatively open structure so as to be readily permeated by the electrolyte and the fabric is preferably subjected to heat treatments under controlled atmosphere to condition the surface of the carbon fibers by promoting the formation of chemically bound active groups on the surface of the carbon fibers such as carboxylic, lactonic, phenolic and/or carbonylic groups. This conditioning improves the catalytic and hydrophilic properties and the catalytic properties of the carbon fibers, which may maintain a predominantly graphitic structure, highly oriented in the direction of the fiber axis that makes the fibers electrically very conductive.

The open-structure fabric used to make the two fluid permeable, substantially three-dimensional electrodes may have a thickness of 1.0 mm to 10.0 mm, though generally they are from 2.0 mm to 5.0 mm thick.

Activated charcoal fabrics are also extremely effective in view of their excellent catalytic character of the carbon fibers. Generally these fabrics are not woven or knitted from carbon fiber yarns but they are made directly from a precursor textile fabric through a carbonization process.

According to an embodiment of the invention, after having fully impregnated the matrix fabric, the two pieces of relatively open, fluid pervious, carbon fiber fabric are disposed over the opposite faces of the impregnated matrix fabrics and tightly held together in a sandwich arrangement by special open lattice implements, in the form of grid-like or honeycomb-like metal jaws that press together the three distinct fabrics at a dense population of point like or linear pressure points, uniformly distributed over the area of the sandwich.

Therefore, at each pressure point and in the neighborhood thereof, the fibers of the two porous fabrics are <<pinned>> onto the impregnated face of the inner matrix fabric and are at least partly wetted by the impregnating solution or resin mix.

The sandwich assembly so held together may then be placed in a carbonization oven and heated under control atmosphere for the time needed to carbonize the precursor material converting these materials into a glassy carbon which fills, sealing, the cavities and pores of the matrix fabric, making it substantially fluid impervious and at the same time fuses the pinned fibers of the two outer carbon mats or fabrics to the composite glassy carbon-matrix fabric structure of the inner layer or septum of the sandwich, thus establishing an excellent transverse electrical continuity of the so formed carbon-base bipolar electrode structure.

Alternatively, in case of a loaded thermosetting resin impregnant, the sandwich assembly is heated in an oven for the time needed to polymerize or to fully polymerize the resin. Also in this case, the conductive resin mix (aggregate) wets the pinned fibers of the outer carbon mats or fabrics and eventually bonds them permanently and in electrical continuity to the conductive septum.

According to a particularly effective further embodiment of the invention, the two external electrodically acting fabrics bonded to the central fluid impervious septum are of a woven or knitted or matted fabric of yarns of carbon fibers having a raised pile of single carbon fibers.

Practically, a three-dimensional fluid permeable electrode structure is represented by the raised pile of carbon fibers or filaments projecting in a substantially orthogonal direction from the face of the substrate carbon fabric.

Each individual filament of the raised pile is a broken and/or lifted stump of a filament or fiber of the yarns with which the fabric is woven or knitted and therefore, apart from the raised portion of it, each individual raised filament remains securely and electrically joined to the other filaments of the yarn and to the knitted or woven fabric as a whole.

Therefore the fabric as a whole provides a highly conductive carbon substrate from which a densely distributed population of individual carbon fibers project for a short distance. The average height of the raised pile may be comprised between about 1.5 mm and 6.0 mm, though shorter and longer pile may be used in special applications.

The individual filament or fibers of carbon of the raised pile may have a diameter generally comprised between 0.01 mm and 0.006 mm, while the average density per unit area of the raised filaments may be generally comprised between 1 and 15 raised filaments per square millimeter.

Of course, the density of raised filaments per unit area, the diameter of the filaments and the average height of the pile are all parameters that may be coordinately optimized to achieve the best performance under the specific conditions of operation (electrolyte composition, maximum current density, electrocatalytic properties of the carbon fiber, temperature, flow rate of electrolyte, etc.).

According to this embodiment, the electrode structure of the invention has an ideal configuration in terms of minimizing the length of electric paths to and from the active sites of the electrodic surface that is represented at least partially by the cylindrical surface of the single carbon fibers projecting from the substrate fabric and the fabric itself bonded to the central septum has an excellent conductivity thus ensuring a truly low resistance path for the current, the electrode structure of the invention represents an ideal answer also to the generally contrasting requirements of providing a relatively large specific surface area (in order to maintain the <<real>> current density relatively low) while favoring an <<unimpeded>> flow of electrolyte along and through the three-dimensional electrode structure.

The outer raised pile of the electrodic structure is outstandingly permeable to a streaming electrolyte being flown tangentially to the cloth surface and ideally through the cell gap occupied by the raised pile.

The carbon fiber fabric may be a woven or a knitted fabric made of a spun yarn of carbon fibers which preferably has a relatively low twist. The fibers of a low twist spun yarn are more readily broken or partially disengaged and lifted by the action of a pile-raising machine, as will be described later. However, any other starting carbon fabric may be used.

The average number of filaments of the yam may be generally comprised between 1500 and 6000.

The carbon fibers may be made either from polyacrylonytrile (PAN) or from pitch or other suitable precursor material.

The pile may be raised either before or after having converted the pre-cursor textile fabric to an essentially charcoal fiber fabric.

According to an alternative embodiment, especially suitable to produce an outstandingly flexible and lightweight bipolar electrode structure, two or more converted (carbonized) textile fabrics may be bonded together to constitute a fluid impervious conductive septum by laminating together the fabrics with interposed therebetween a reflowable conductive foil of a substantially thermoplastic resin and graphite or carbon particles and/or fibers aggregate. Thereafter the two faces of the bonded together fabrics are subjected to a conventional mechanical pile raising treatment in order to lift a dense pile of carbon fibers.

Transverse electrical conductivity is ensured by a densely distributed population of direct contacts between the carbon fiber yarns of the two fabrics, in correspondence of geometrically coinciding peaks of a normally corrugated surface of a knitted or woven fabric.

Electrical continuity across the sandwich beside on direct fabric to fabric points of contact determined by a mutually encroaching of projections of the two fabrics being pressed one into contact with the other through the thickness of the fluidized thermoplastic resin aggregate will rely also on the surrounding plastically flown electrically conductive aggregate, filling the intervening cavities between projections of the two fabrics and practically sealing the sandwich and making it substantially impermeable to transverse fluid flow.

DESCRIPTION OF SEVERAL EMBODIMENTS OF THE INVENTION

It should be remarked that the following description of several preferred embodiments is not intended to limit the scope of this invention as defined in the annexed claims, but has a purely illustrative purpose in order to facilitate the practicing of the invention by any person skilled in the art.

Figure 1:
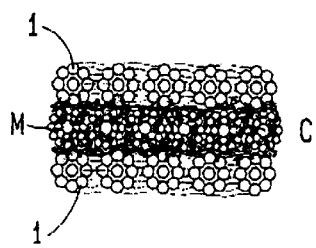
FIGS. 1, 2 and 3 are graphic representations of a bipolar electrode structure of the invention, according to alternative embodiments.

FIG. 1 shows a cross section of a carbon-base bipolar electrode made according to a first embodiment.

In the figure are recognizable three distinct fabrics of carbon fibers or of yarns of carbon fibers stacked in a sandwich arrangement. The central or matrix fabric M has a relatively tight weave as compared to the outer fabrics 1 that are identical and have a relatively open (loosely woven) weave so as to be readily permeated by the electrolyte. Alternatively, the two outer fabrics 1 may be unwoven mats or felts of carbon fibers also having a relatively open structure as to be readily permeated by the electrolyte.

The matrix layer M is hydraulically sealed by practically filling all interstices and pores with an electrically conductive carbon containing material C, shown in the sketch by the darkened interstitial areas.

The sealing material C is essentially electrically conductive and, according to a first embodiment, may be a glassy carbon, formed in situ by carbonizing a precursor material with which the matrix fabric M is pre-impregnated. The precursor material may be any suitably soluble or suspendable, partly polymerized or prepolymer of a polyester, or of a polyether or of a polyurethane, or of a furfuryl alcohol and the like. In practice, any material that can be carbonized into a substantially glassy carbon material, in a form suitable to be dispersed within the matrix fabric of carbon fibers may be used.

Alternatively, the electrically conductive material C, filling the interstices and hydraulically sealing the carbon fabric based, composite septum may be a polymerized conductive resin aggregate as for example a mixture of a styrene-ethylene/butylene-styrene block polymer and a high density polyethylene, an epoxy resin, and the like, loaded with carbon and/or graphite particles and/or fibers such to confer to the aggregate a good electrical conductivity. The mixture, still in fluid state, is pre-impregnated into the matrix fabric and eventually polymerized in situ.

In either cases, the conversion to a glassy carbon of the impregnated precursor material or the polymerization of the impregnated resin mix, beside hydraulically sealing the matrix fabric to constitute a hydraulically impervious and electrically conductive composite septum, makes the composite septum substantially rigid.

As an essential aspect of the invention, the conductive sealing material C also fuses and/or bonds to the composite septum the contacting fibers of the two outer fabrics 1, suitably pressed into a sandwich assembly during the carbonization or polymerization step.

The result is an effective bipolar electrode structure that couples an outstanding transverse electrical conductivity to excellent mechanical strength and lightweight.

Figure 2:
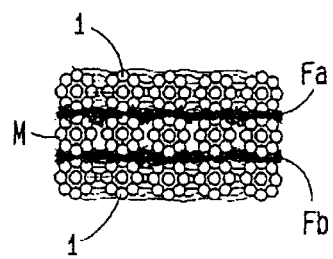

According to the alternative embodiment depicted by the cross section of FIG. 2, the carbon-base bipolar electrode structure has its hydraulically imperviousness provided by the reflown and resolidified electrically conductive material of two foils Fa and Fb of a thermoplastic loaded with graphite or carbon particles and/or fibers, placed on the two faces of the matrix fabric M, interposed between the matrix fabric M and the outer electrode fabrics 1.

The foils of reflowable conductive thermoplastic Fa and Fb may be of a film of a loaded polyethylene or mixture of a styrene-ethylene/butylene-styrene block polymer and a high density polyethylene, or a trifluoro-chloro-polyethylene or any equivalent conductive carbon loaded thermoplastic. Generally, the thickness of the foils may range from 0.5 to 2.0 mm.

The so arranged stack is hot laminated to cause a sufficient fluidization of the two conductive thermoplastic foils Fa and Fb, the material of which fills the interstices sealing the pores open to contact with the plasticized material of the matrix layer and bonding thereto the contacting fibers of the outer fabrics 1.

Also in this case, the resulting sandwich assembly has an excellent transverse conductivity, strength and lightweight and maintains a greater flexibility than the composite of FIG. 1.

Figure 4:
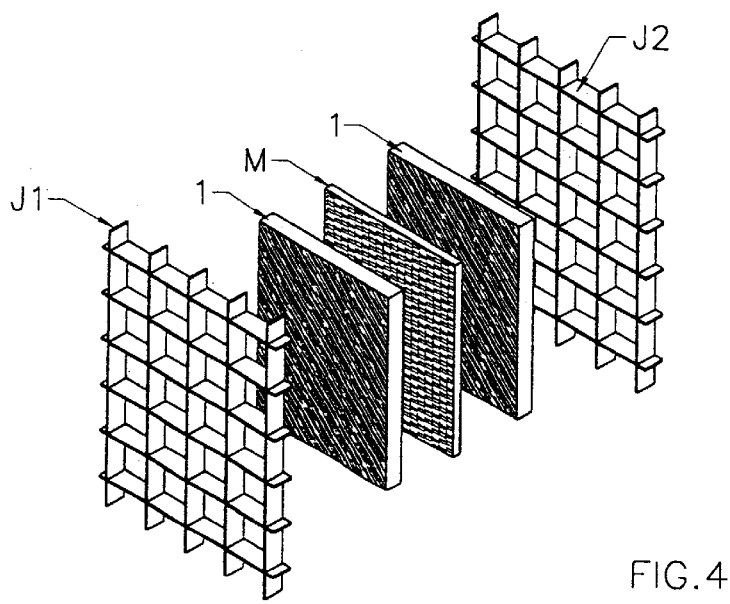
FIGS. 4 and 5 show schematically how the sandwich assembly to produce the structures of FIGS. 1 and 2 is held together during the carbonization or polymerization treatment.
Figure 5:
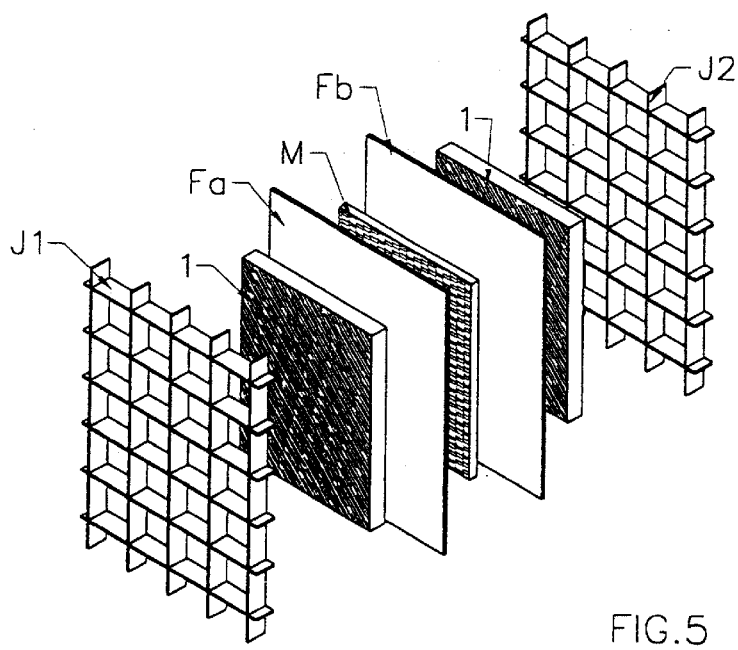

In FIGS. 4 and 5 are depicted suitable arrangements for constructing the structures of FIGS. 1 and 2.

As shown, special pressing jaws J1, J2, made in the form of an open-structure metal latticework, in the example shown in the form of honeycomb structures of sheet metal. The edges of the metal plates that make up the honeycomb structures J1 and J2 may have an indented or sawtooth profile, such that the components of the sandwich assembly, namely the pre-impregnated matrix fabric M and the two outer fabrics 1 in FIG. 4 and the matrix fabric M, the two interposed foils of electrically conductive thermoplastic Fa and Fb and the outer fabrics 1 in FIG. 5, are pressed at a uniformly and densely distributed pressure points over the whole area of the sandwich.

The open structure of the jaws J1 and J2 permits the escape of vapors and gases from the sandwich during the heat treatment of carbonization or of polymerization and does not compress the rather open outer fabrics 1 too extensively.

Figure 3:
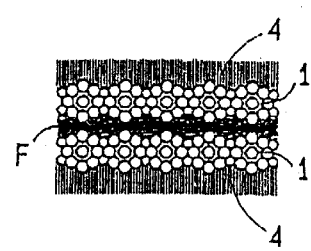

Another embodiment of the invention is depicted in FIG. 3. According to this embodiment, the hydraulically impervious septum is constituted by bonding together two similar woven or knit fabrics 1 of multifilament yarns of carbon fibers, by hot laminating the two fabrics 1 together with an interposed foil F of a conductive thermoplastic aggregate of graphite or carbon particles and/or fibers. During the hot lamination, the conductive thermoplastic foil F is fluidized to an extent sufficient to plastically flow and fills the interstices left between the yarns of the two fabrics 1 pressed into an intimate contact with each other.

Transverse electrical conductivity is provided by both direct contact between the two fabrics 1 bonded back to back and by the conductive thermoplastic resolidified into the interstices to effectively seal hydraulically the sandwich assembly.

As shown in FIG. 3, according to this alternative embodiment, the electrode acting outer structures of the bipolar assembly are at least partly constituted by a raised pile 4 of carbon fibers.

The pile raising treatment is preferably effected after constituting the fluid impervious septum assembly by bonding together the two substrate fabrics that in this case are made of woven or knit yarns of carbon fibers, preferably having a relatively low twist in order to facilitate the subsequent pile raising treatment that provides for a readily permeable carbon electrode structures on the two faces of the bipolar electrode.

Figure 6:
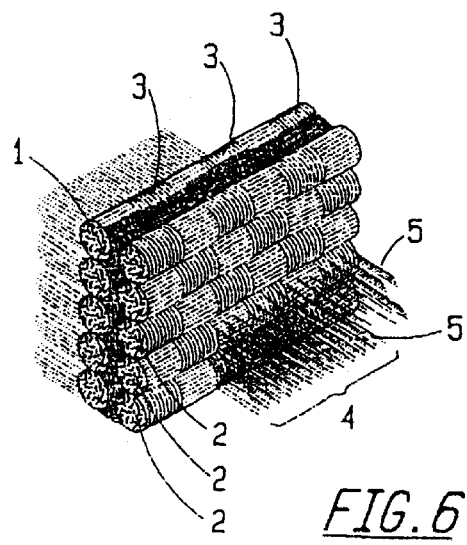
FIG. 6 is a perspective fragmentary view of two conductive carbon fabrics sealingly bonded back-to-back to constitute a fluid impervious septum and having a raised pile of carbon fiber stumps.

The fragmentary perspective view of FIG. 6 represents two plane weave fabrics 1 of weft yarn 2 and warp yarns 3, both of carbon fibers. The average number of filaments in the yarns 2 and 3 may be comprised between 1000 and 6000 and the fibers or individual filaments of the yarn may have a moderate to extremely low degree of twisting.

By way of example of a plane weave cloth, the warp yarns (ends) pass over and under alternate weft yarns (picks) and vice versa and the number of ends x picks per unit length may be generally comprised between 40×40/10 cm and 140×140/10 cm.

The two fabrics are bonded together by hot pressing them with an interposed electrically conductive foil of polyethylene loaded with graphite powder and/or fibers and having a bulk resistivity comprised between 0.3 Ω cm and 1.0 Ω cm. Other reflowable thermoplastics other than polyethylene may be used, for example a trifluoro-chloro-polyethylene thermoplastic resin loaded with graphite particles and broken carbon fibers to make the aggregate conductive may be used. The hot pressing temperature is optimized to produce a controlled degree of fluidization of the aggregate to effectively seal the pores and make the assembly impervious to electrolyte flow therethrough without excessively permeate the two fabrics.

The outer surface of the fabrics 1 has a raised pile 4 (mechanically raised after bonding together the two substrate fabrics) of individual carbon fibers or filaments 5. The average height of the carbon fiber stumps 5, lifted off the respective low twist yarns (weft and warp) may be generally comprised between 1.5 and 6.0 mm or even larger.

The pile-raising may be performed by treating the woven or knitted carbon fabric 1 in a purposely configured pile-raising machine, according to a very well known and commonly performed treatment of textile fabrics.

Such a kind of textile processing is well known and there exist a wealth of technical and commercial literature describing it.

U.S. Pat. No. 4,463,483 disclose a machine of the type that is commonly used for fabric napping and pile-raising.

The parameters of the pile-raising treatment will be adjusted to the particular carbon fabric or precursor textile fabric to be treated.

The pile-raising treatment lifts single filaments by eventually breaking them of upper or superficial layers of the relatively low twist yarns, pulling a population of individual fiber stumps off the yarns and leaving them in a substantially upright position. Depending on the geometry of the needle covering and of the regulation of the pile-raising rollers, the fabric may be treated once or several times in succession (several passes) until the desired density of pile is obtained (number of filaments raised per unit area of fabric).

Of course, the pile-raising treatment causes the tearing off of a moderate amount of broken fibers that is lost, however this loss is extremely small and do not alter in any appreciable way the original specific weight, mechanical properties and electrical conductive properties of the fabric.

The raised pile 4 of carbon fibers 5 constitute a substantially three-dimensional (large surface area) electrode structure. The fabric 1, though constituting a portion of the overall active electrode surface, represents in practice a highly conductive substrate having an excellent conductivity both along the plane of the fabric as well as transversally through the thickness of the fabric. Moreover, the superficial disruption of the fabric upon raising the pile, contributes to increase the available electrode area.

Figure 7:
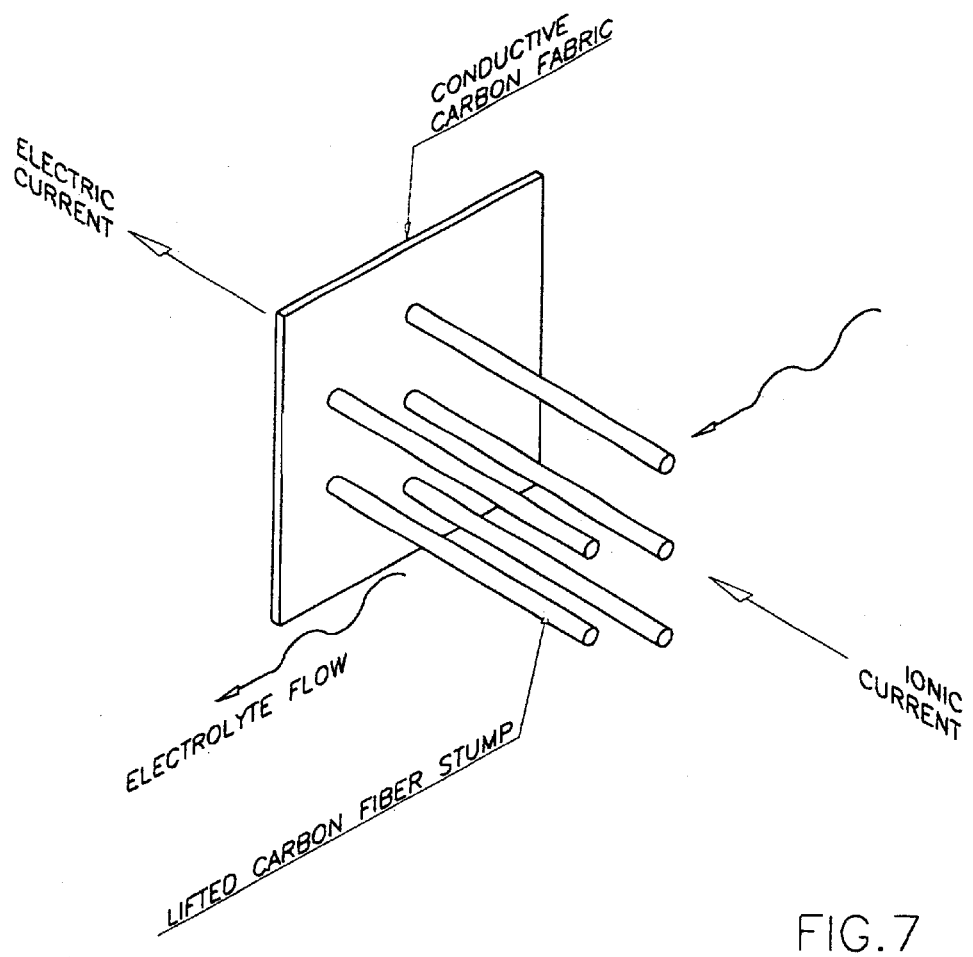
FIG. 7 is a schematic illustration of the electrode acting pile.

The exceptionally favorable configuration of the three-dimensional electrode structure of the invention can be readily appreciated by observing the schematic illustration of FIG. 7.

By assuming an average length of the lifted carbon fiber stumps of 0.3 mm and a diameter of each individual carbon filament equal to 0.01 mm, each filament 5 of the raised pile 4 (FIGS. 6, 7) will represent an electric resistance that for a volume resistivity of the carbon of 400 $\mu\Omega$ cm, maybe calculated as being of 15,28 Ω from tip to base.

For a cell current density (over the surface) of 1000 A/m$^2$ corresponding to 1 mA/mm$^2$, the ohmic drop along one single carbon filament, by assuming an hypothetical worst case of carrying 1 mA from tip to root would be equal to 15,3 mV.

Of course a pile density of several filaments per mm$^2$ of projected cell (electrode) surface, the actual ohmic drop would be proportionally less.

On the other hand, each 0.3 mm long individual carbon fiber stump 5 makes an additional cylindrical surface of about 79*10$^{-6}$ mm$^2$, available for supporting an electrodic half cell reaction.

Higher pile densities will proportionally increase this contribution, besides the increase attributable to the <<disruption>> of the orderly superficial texture of the base fabric.

In practice, the pile-raising process will produce populations of taller and shorter fiber stumps for a combined overall pile density that may be significantly larger than one filament per square millimeter, thus providing a most effective three-dimensional electrode structure.

On the other hand, as may be appreciated by the schematic representation of FIG. 7, the raised pile of single fiber stumps, remains readily permeable to a transverse flow of electrolyte (orthogonal to the carbon fiber stumps that project normally out of the planar surface of the substrate fabric).

Figure 8:
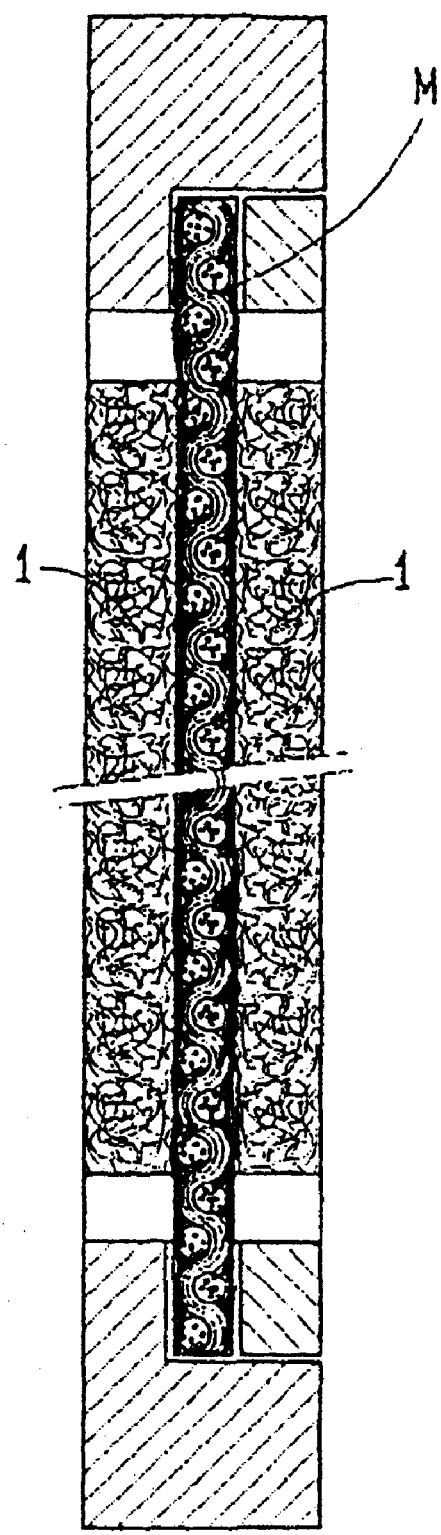
FIG. 8 depicts a fluid impermeable septum bipolar electrode of the present invention fitted in a cell frame.

This fact is of great importance in ensuring the fastest refreshing of the electrolyte in contact with the active surface of the three-dimensional electrode structure for achieving the fastest transfer of reacting ions to and from electrodically active sites distributed over the three-dimensional electrode surface FIG. 8 illustrates a bipolar electrode structure of the invention, mounted in a cell frame. A plurality of these elements are stackable in a filter-press arrangement, with interposed ion exchange membrane separators, between two end elements.

What is claimed is:

1. A carbon-base bipolar electrode for electrochemical redox reactions in an acid electrolyte in the form of a fluid impervious and electrically conductive septum, at least a face of which consists, at least partially, of a fluid pervious woven or unwoven electrodically active fabric of carbon fibers or of yarns of carbon fibers, characterized in that said electrically conductive fluid impervious septum is a composite of a matrix fabric in the form of a tightly knit or woven fabric of carbon fibers or of yarns of carbon fibers the pores of which are hydraulically sealed by an electrically conductive carbon containing material at least partly filling the pores of said matrix fabric.

2. The carbon-base bipolar electrode of claim 1, wherein said carbon containing electrically conductive material is a glassy carbon formed in situ by thermal conversion of a precursor material with which said matrix fabric is pre-impregnated.

3. The carbon-base bipolar electrode of claim 1, wherein said carbon containing electrically conductive material is a polymerized thermosetting resin loaded with carbon and/or graphite particles and/or fibers.

4. The carbon-base bipolar electrode of claim 1, wherein said carbon containing electrically conductive material is a thermally reflown aggregate of a thermoplastic resin an carbon and/or graphite particles and/or fibers.

5. The carbon-base bipolar electrode of claim 1, wherein said fluid pervious fabric is bonded in electrical continuity to the hydraulically sealed composite by said carbon containing electrically conductive material.

6. The carbon-base bipolar electrode of claim 1, wherein said fluid pervious fabric on the face of the electrode is a raised pile of single carbon fibers.

7. The electrode of claim 6, wherein individual filaments of said raised pile have a diameter comprised between 0.01 mm and 0.006 mm.

8. The electrode according to claim 6, wherein the average density per unit area of the filaments of said raised pile is comprised between 1 and 15 raised filaments per square millimeter.

9. A process for fabricating a carbon-base bipolar electrode for electrochemical redox reactions in an acid electrolyte comprising the steps of:
   a) providing a matrix fabric or of carbon fibers of yarns of carbon fibers;
   b) providing a fluid pervious fabric of carbon fibers or of yarns of carbon fibers;
   c) procuring a fluid mixture containing a material belonging to a carbonizable precursor of glassy carbon, a polymerizable unpolymerized or partly polymerized thermosetting resin loaded with graphite or carbon particles and/or fibers;
   d) impregnating said matrix fabric with said fluid mixture;
   e) placing pieces of said fluid pervious fabric of carbon fibers or of yarns of carbon fibers in contact with the opposite faces of the impregnated matrix fabric;
   f) subjecting the sandwich to a heat treatment under conditions and for the time sufficient to form said glassy carbon or to complete polymerization of said loaded thermosetting resin within the pores of said matrix fabric and on the contacting carbon fibers of said pieces of fluid pervious fabrics held in contact on the opposite faces of the impregnated matrix fabric, hydraulically sealing the porosity of said matrix fabric and bonding said two pieces of porous fabric to the sealed matrix fabric with an electrically conductive glassy carbon or conductive particles and/or fibers and resin aggregate.

10. The processes of claim 9, characterized in that said sandwich is held together by an open metal latticework pressing the outer pieces of fluid pervious fabric of carbon fibers or of yarns of carbon fibers into intimate contact with the surface of the impregnated matrix fabric or of said interposed electrically conductive thermoplastic foils at a plurality of pressure points uniformly and densely distributed over the entire contact areas without hindering gas and vapor flows out of the sandwich during said heat treatment.

11. A process for fabricating a carbon-base bipolar electrode for electrochemical redox reactions in an acid electrolyte comprising the steps of:
   a) providing a matrix fabric or of carbon fibers of yarns of carbon fibers;
   b) providing fluid pervious fabric of carbon fibers or of yarns of carbon fibers;
   c) procuring a foil of an electrically conductive aggregate of a thermoplastic resin and carbon particles and/or fibers;
   d) placing pieces of said electrically conductive foil over opposite faces of said matrix fabric;
   e) placing pieces of said fluid pervious fabric of carbon fibers or of yarns of carbon fibers in contact with the opposite faces of the impregnated matrix fabric;
   f) subjecting the sandwich to a hot pressing under conditions and for the time sufficient to reflow said conductive aggregate, hydraulically sealing the pores of said matrix fabric and bonding said pieces of porous fabric to the sealed matrix fabric with re-solidified conductive aggregate.

12. The processes of claim 11 wherein said sandwich is held together by an open metal latticework pressing the outer pieces of fluid pervious fabric of carbon fibers or of yarns of carbon fibers into intimate contact with the surface of the impregnated matrix fabric or of said interposed electrically conductive thermoplastic foils at a plurality of pressure points uniformly and densely distributed over the entire contact areas without hindering gas and vapor flows out of the sandwich during said heat treatment.

* * * * *